(12) United States Patent
Alameh et al.

(10) Patent No.: US 8,890,823 B2
(45) Date of Patent: Nov. 18, 2014

(54) SYSTEM AND METHOD FOR REDUCING OCCURRENCES OF UNINTENDED OPERATIONS IN AN ELECTRONIC DEVICE

(75) Inventors: Rachid M. Alameh, Crystal Lake, IL (US); Timothy Dickinson, Crystal Lake, IL (US); Aaron L. Dietrich, Caledonia, IL (US); Robert A. Zurek, Antioch, IL (US)

(73) Assignee: Motorola Mobility LLC, Libertyville, IL (US)

( * ) Notice: Subject to any disclaimer, the term of this patent is extended or adjusted under 35 U.S.C. 154(b) by 176 days.

(21) Appl. No.: 13/346,298

(22) Filed: Jan. 9, 2012

(65) Prior Publication Data
US 2013/0176264 A1 Jul. 11, 2013

(51) Int. Cl.
*G09G 5/00* (2006.01)
(52) U.S. Cl.
USPC ........ 345/173; 345/169; 345/174; 455/556.1; 455/556.2; 455/566
(58) Field of Classification Search
USPC ............... 345/173–178; 178/18.01–19.06; 455/556.1, 556.2, 566
See application file for complete search history.

(56) References Cited

U.S. PATENT DOCUMENTS

| | | | |
|---|---|---|---|
| 5,563,632 A | 10/1996 | Roberts | |
| 5,604,314 A | 2/1997 | Grahn | |
| 5,854,625 A | 12/1998 | Frisch et al. | |
| 6,504,530 B1 * | 1/2003 | Wilson et al. | 345/173 |
| 7,616,191 B2 | 11/2009 | Matta | |
| 7,623,118 B2 | 11/2009 | Skillman et al. | |
| 7,656,394 B2 | 2/2010 | Westerman et al. | |
| 7,706,916 B2 | 4/2010 | Hilton | |
| 7,726,452 B2 | 6/2010 | Kraner | |
| 8,269,731 B2 * | 9/2012 | Molne | 345/173 |
| 8,310,457 B2 * | 11/2012 | Faubert et al. | 345/173 |
| 2002/0175836 A1 | 11/2002 | Roberts | |

(Continued)

FOREIGN PATENT DOCUMENTS

| | | |
|---|---|---|
| WO | 0235460 A1 | 5/2002 |
| WO | 2004037497 A1 | 5/2004 |
| WO | 2010026395 A1 | 3/2010 |

OTHER PUBLICATIONS

Jerome Pasquero et al., "A Haptic Wristwach for Eyes-Free Interactions," CHI 2011 Session: Tactile Interaction, May 7-12, 2011, Vancouver BC Canada, pp. 3257-3266.

(Continued)

*Primary Examiner* — Jennifer Nguyen
(74) *Attorney, Agent, or Firm* — Shumaker & Sieffert, P.A.

(57) ABSTRACT

A method of operating an electronic device, and an electronic device, are disclosed in which occurrences of unintended operations of the electronic device, such as can occur in response to inadvertent actuations of actuators of the electronic device, are reduced. In one example embodiment, the method 500 includes detecting 510 an actuation of a first sensor that is associated with a first touch-sensitive component of the electronic device, and acquiring 512 data from an additional sensor of the electronic device. The method also includes determining 518, based at least in part upon the data, whether the actuation is valid, and either performing 524 or refraining 522 from performing at least one operation based at least in part upon the determining. In at least one additional embodiment, the first sensor is a piezoelectric sensor and the additional sensor is an accelerometer.

11 Claims, 5 Drawing Sheets

(56) References Cited

U.S. PATENT DOCUMENTS

| | | | | |
|---|---|---|---|---|
| 2006/0279548 | A1* | 12/2006 | Geaghan | 345/173 |
| 2007/0085157 | A1 | 4/2007 | Fadell et al. | |
| 2007/0100666 | A1 | 5/2007 | Stivoric et al. | |
| 2008/0132313 | A1 | 6/2008 | Rasmussen et al. | |
| 2008/0136662 | A1 | 6/2008 | Bellows et al. | |
| 2009/0152984 | A1 | 6/2009 | Yamada et al. | |
| 2009/0189873 | A1 | 7/2009 | Peterson et al. | |
| 2009/0209285 | A1 | 8/2009 | McMahan | |
| 2009/0262078 | A1 | 10/2009 | Pizzi | |
| 2010/0090973 | A1 | 4/2010 | Algreatly | |
| 2010/0152545 | A1 | 6/2010 | Ramsay et al. | |
| 2011/0133934 | A1 | 6/2011 | Tan et al. | |
| 2011/0291951 | A1* | 12/2011 | Tong | 345/173 |
| 2011/0306304 | A1 | 12/2011 | Forutanpour et al. | |

OTHER PUBLICATIONS

Rachid M. Alameh et al., "Method and Apparatus for a Touch and Nudge Interface", U.S. Appl. No. 12/982,428, filed Dec. 30, 2010.

United States Patent and Trademark Office, "Non-Final Rejection" for U.S. Appl. No. 12/982,428, Feb. 5, 2013, 10 pages.

Patent Cooperation Treaty, "PCT Search Report and Written Opinion of the International Searching Authority" for International Application No. PCT/US2012/069391, Jun. 6, 2013, 14 pages.

3M Touch Systems UK LTD., "Technology Comparison: Surface Acoustic Wave, Optical and Bending Wave Technology", http://multimedia/3m.com/mws/mediawebserver?6666660Zjcf61Vs6EVs66s_NfCOrrrrQ-, retrieved from the Internet on May 4, 2013, 4 pages.

United States Patent and Trademark Office, "Non-Final Rejection" for U.S. Appl. No. 12/982,428, May 9, 2013, 17 pages.

Patent Cooperation Treaty, "PCT Search Report and Written Opinion of the International Searching Authority" for International Application No. PCT/US2011/066539, Mar. 20, 2012, 9 pages.

Inernational Preliminary Report on Patentability, from counterpart International Application No. PCT/US2012/0639391, dated Jul. 24, 2014, 10 pp.

* cited by examiner

SYSTEM AND METHOD FOR REDUCING OCCURRENCES OF UNINTENDED OPERATIONS IN AN ELECTRONIC DEVICE

FIELD

The present invention relates to electronic devices such as mobile devices that have actuators that can be actuated by motions that are not intended by a user to cause actuation, and more particularly to systems and methods in such electronic devices that reduce the extent to which such inadvertent actuation produces undesired consequences for the user.

BACKGROUND

Electronic devices, and particularly mobile electronic devices, can include a variety of different types of actuators depending upon the embodiment. Occasionally events occur that cause inadvertent actuation or triggering of an electronic device actuator. For example, a mobile device can accidentally be dropped, and contact with a floor or other surface can inadvertently and unintentionally cause actuation of a power on/off button. Such accidental actuation can be undesirable for various reasons. Among other things, such inadvertent actuation can in turn cause the mobile device to take other actions or produce consequences that are unintended or undesirable to the user. For example, inadvertent actuation of a power on/off button may unintentionally disconnect an on-going telephone call.

In view of the above, it would therefore be advantageous if an improved system and method could be developed for implementation in electronic devices, such as mobile electronic devices, so that consequences of inadvertent actuations can be partly or entirely avoided.

DETAILED DESCRIPTION

Figure 1:
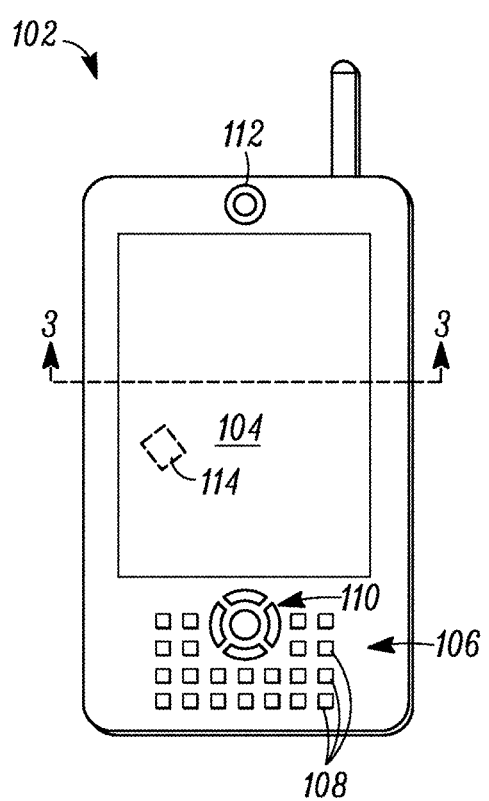
FIG. 1 is a schematic diagram showing a front view of an example mobile device having among other things a piezo lens actuator.

In at least some embodiments, an electronic device employs a system and/or method by which the device classifies actuation events experienced by a touch screen (or possibly other sensor) into two different types, namely, valid and invalid actuation events. Both the valid and invalid actuation events are events that can occur (or can be triggered) as a result of different types of motions or forces (e.g., two or more different motions or forces) experienced by the device and thus experienced by the touch screen (and a motion or force/pressure sensor device associated therewith, such as a piezoelectric component). Upon distinguishing between valid and invalid actuation events, the device in turn varies its performance accordingly so that operation of the device is appropriate to reflect the device's analysis of whether any particular actuation event was intended by the user or not. As a result of such operation, undesired or unintended operations of the device and corresponding consequences can be reduced.

Depending upon the embodiment, to classify different actuation events, the device can consider one or more of a variety of sensory data (e.g., accelerometer, gyro, and other embedded sensor data), operational mode data, other contextual data, and/or other data such as user settings, specifications, or preferences. Thus, for example, the device can use any of a variety of operational mode, background environment, environmental condition, device location, device position, device speed, device carry mode, manner of device handling, device use history, user specification, and other types of data to assist in determining whether a particular actuation event should be classified as valid or invalid. In at least some embodiments, information regarding both the movement/force experienced by the device triggering the actuation and also other information can be utilized by the device in its determination. Further, in at least some embodiments, the other information can include any of a wide variety of operational mode, operational context, user preference, setting, or specification information.

As discussed in further detail herein, it should be appreciated that there are numerous circumstances in which events occur that can potentially result in inadvertent actuations that might produce unintended or undesirable consequences, and in which therefore classification of the actuations as valid or invalid is particularly helpful. For example, there are unintended actions such as the accidental dropping of a mobile device onto a floor or other surface that can inadvertently cause actuation of a button such as a power on/off button of the mobile device or actuation of a touch screen piezoelectric device that, in the absence of consideration of whether the actuation was valid or invalid, could otherwise potentially cause premature termination of a phone call or initiation of an unintended telephone call. Also for example, there are actions that are intended for some purpose or another (or at least not entirely unintended) but that are not intended to cause actuation of actuator(s) on a mobile device and yet still can cause unintended and inadvertent mobile device actuator actuations and produce unintended or undesirable consequences. For example, a user while holding a mobile device can also simultaneously make vigorous hand or arm movements for any of a variety of reasons (e.g., waving goodbye, jogging or walking with the mobile device in-hand, or opening a door knob) that are not intended to cause actuation of actuator(s) on the mobile device but could nevertheless inadvertently do so. Again, with appropriate consideration by the mobile device as to whether the actuations should be classified as valid or invalid, unintended or undesired mobile device operation and consequences can be avoided.

FIG. 1 shows a schematic of a front view of an example mobile electronic device 102. In the present embodiment, the mobile electronic device 102 is a cellular telephone, albeit it should be understood that the present disclosure is intended to encompass and be implemented in relation to any of a variety of electronic devices including, for example, personal digital assistants (PDAs), smart phones, wireless headsets, wearable electronic devices (e.g., wristwatches), cordless telephones, AM/FM and other types of radios, navigation devices, laptop or notebook computers, tablet computers, pagers, PMPs (personal media players) such as MP3 or MP4 players, electronic book readers, DVRs (digital video recorders), gaming devices, and even flashlights. Further, even though FIG. 1 (as well as FIGS. 2-3 below) concerns a mobile electronic device 102, it should further be understood that the present disclosure is not intended to be limited to mobile devices or limited to implementation in mobile devices, but rather can encompass and be implemented in a variety of other electronic devices such as radio alarm clocks, wired telephones, other stationary or typically-stationary electronic devices (including possibly desktop computer and/or televisions, especially smaller versions of such devices), and numerous other devices. Indeed, the present disclosure is intended to encompass a wide variety of mobile and other electronic devices that can experience movements or other events that can potentially precipitate inadvertent or unintentional actuation or triggering of one or more actuators of the respective device.

As shown particularly in FIG. 1, the mobile device 102 in the present embodiment includes a touch screen (which also is a video display) 104 and a keypad region 106 having alpha-numeric keys 108 and a navigation device (in this case, a "five-way navigation area") 110. Further, as discussed further below, in the present embodiment the touch screen 104 is formed by way of a floating lens that can move up and down relative to a piezoelectric component internal to the mobile device 102, such that movement of the touch screen triggers the piezoelectric component. Also as shown, in the present embodiment, the mobile device 102 further includes an infrared sensor (or sensors) 112 and an acceleration sensor or accelerometer 114 (shown in phantom), which can for example be a three-axis accelerometer and/or a three-axis gyroscope. In other embodiments, other input devices, actuators, sensors, and/or output devices can be provided on the mobile electronic device (or other electronic device). For example, in some other embodiments, one or more haptic components can be provided. It will be appreciated that in at least some embodiments a user can activate and deactivate various input devices to improve user experience and device functionality.

As will be discussed in further detail, in the present embodiment, the mobile device 102 includes a system, and performs a method, for reducing (possibly to the point of eliminating) unintended consequences of inadvertent actuation of the piezoelectric component resulting from movement of the floating lens constituting the touch screen 104, as can occur due to motions of (and external forces impacting) the mobile device 102. Depending upon the embodiment or implementation, the mobile device 102, based upon other sensed information or signals or criteria, determines whether a given actuation of the piezoelectric component is valid or invalid. Upon determining that a particular actuation is invalid, the mobile electronic device 102 operates to prevent the mobile device from responding to the given actuation of the piezoelectric component, or alternatively operates to prevent the mobile device from responding to the given actuation in a normal manner. That is, the mobile device 102 operates as to partly or entirely avoid unintended operation(s) and/or other unintended consequences that might otherwise occur in response to the actuation of the piezoelectric component.

Figure 2:
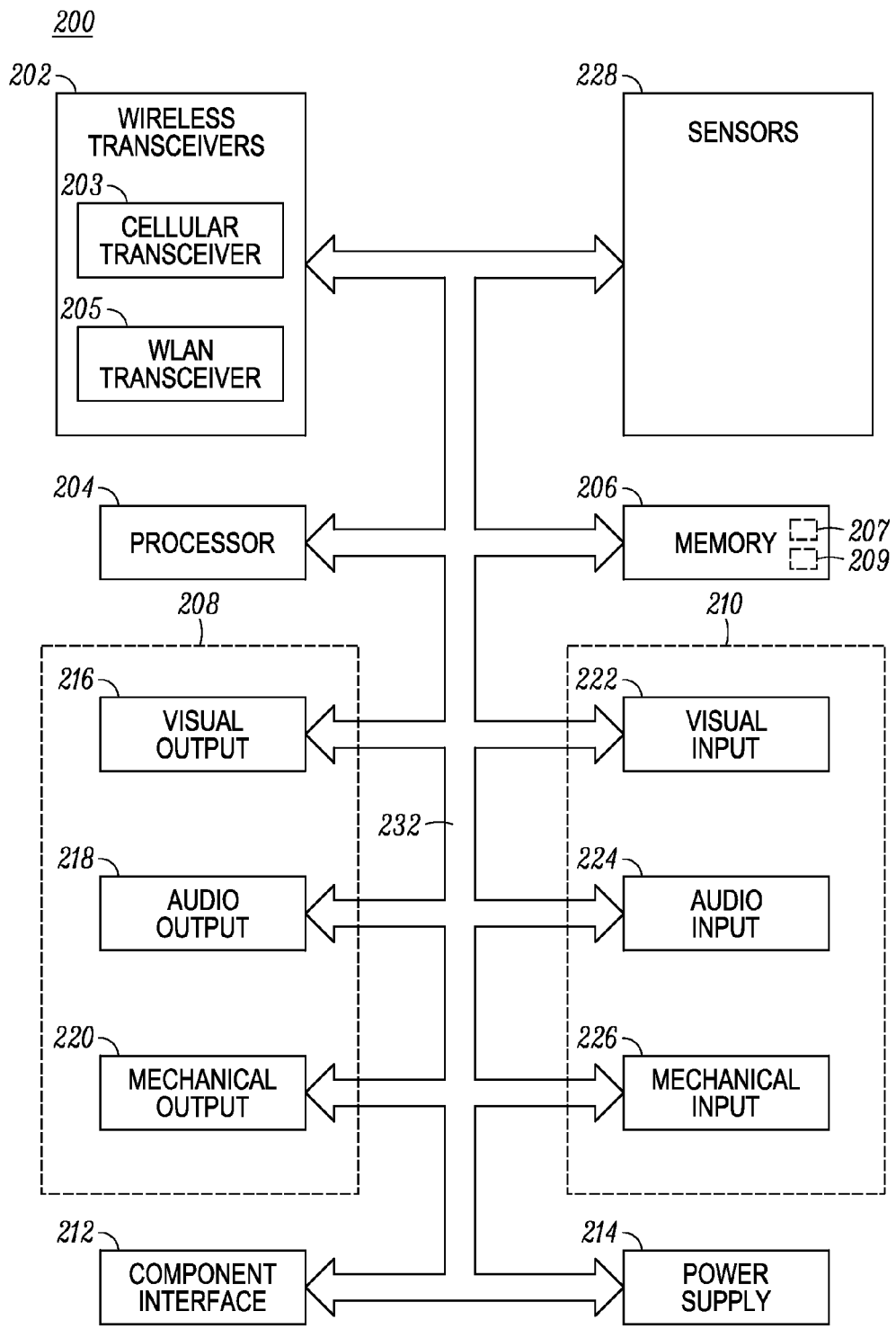
FIG. 2 is a block diagram showing in additional detail various example components of the mobile device of FIG. 1.

Turning to FIG. 2, a block diagram shows in more detail example internal components 200 of the mobile electronic device 102 of FIG. 1 in accordance with one embodiment. As shown, the components 200 include one or more wireless transceivers 202, a processor 204 (e.g., a microprocessor, microcomputer, application-specific integrated circuit, etc.), a memory portion 206, one or more output devices 208, and one or more input devices 210. In at least some embodiments, a user interface component is present that includes one or more of the output devices 208, such as a display, and one or more of the input devices 210, such as a keypad or touch sensor. In the present embodiment, the touch screen 104 can be considered to constitute one such combination user interface component. The internal components 200 further include a component interface 212 to provide a direct connection to auxiliary components or accessories for additional or enhanced functionality. The internal components 200 preferably further include a power supply 214, such as a battery, for providing power to the other internal components while enabling the mobile device 102 to be portable. All of the internal components 200 can be coupled to one another, and in communication with one another, by way of one or more internal communication links 232 (e.g., an internal bus).

Each of the wireless transceivers 202 utilizes a wireless technology for communication, which can include for example (but is not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth and IEEE 802.11(a, b, g or n), or other wireless communication technologies such as infrared technology. In the present embodiment, the wireless transceivers 202 include a cellular transceiver 203 and a wireless local area network (WLAN) transceiver 205, although in other embodiments only one of these types of wireless transceivers is present (or alternatively possibly neither of these types of wireless transceivers, and/or possibly other types of wireless transceivers is/are present).

Operation of the wireless transceivers 202 in conjunction with others of the internal components 200 of the mobile device 102 can take a variety of forms. Among other things, the operation of the wireless transceivers 202 can include, for example, operation in which, upon reception of wireless signals, the internal components detect communication signals and one of the transceivers 202 demodulates the communication signals to recover incoming information, such as voice and/or data, transmitted by the wireless signals. After receiving the incoming information from one of the transceivers 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceivers 202 convey the modulated signals by way of wireless and (possibly wired as well) communication links to other (e.g., external) devices.

Depending upon the embodiment, the input and output devices 208, 210 of the internal components 200 can include a variety of visual, audio and/or mechanical input and output devices. More particularly, the output device(s) 208 can include one or more visual output devices 216, one or more audio output devices 218, and/or one or more mechanical output devices 220. In the mobile device 102 of FIG. 1, the visual output devices 216 particularly refer to the video screen provided by the touch screen 104. The floating lens employed to form the touch screen 104 also can serve as a speaker as well as a vibrating mechanism, and thus can also be considered to be among the audio output devices 218 and the mechanical output devices 220. In other embodiments, the visual output devices 216 can include other devices such as a liquid crystal display, or a light emitting diode indicator, the audio output devices 218 can include other devices such as a loudspeaker, an alarm and/or buzzer, and the mechanical output devices 220 can include other devices such as other types of vibrating mechanisms (e.g., rotary vibrators, linear vibrators, and variable speed vibrators).

Likewise, by example, the input device(s) 210 can include one or more visual input devices 222, one or more audio input devices 224, and one or more mechanical input devices 226. In the mobile device 102 of FIG. 1, for example, the input devices 210 can include the infrared sensor 112, and the mechanical input devices 226 include each of the touch screen 104, the alpha-numeric keys 108, and the navigation device (or navigation cluster) 110. In other embodiments, the visual input devices 222 can also include other optical sensors (for example, a camera), the audio input devices 224 can include devices such as a microphone, and the mechanical input devices 226 can include various selection buttons (e.g., a "back" button), a touch pad, a capacitive sensor, a flip sensor, a motion sensor, and a switch. Generally speaking, actions that can actuate one or more of the input devices 210 can include not only the physical pressing/actuation of the touch screen 104 or other buttons or other actuators, but can also include, for example, opening the mobile device 102, unlocking the device, moving the device to actuate a motion, moving the device to actuate a location positioning system, and operating the device.

As shown in FIG. 2, the internal components 200 of the mobile device 102 also can include one or more of various types of sensors 228 that are coupled to other components by the internal communication links 232. In the present embodiment, the accelerometer 114 can be considered one of the sensors 228. In other embodiments, the sensors 228 can include, for example, proximity sensors (a light detecting sensor or an ultrasound transceiver), capacitive sensors, altitude sensors, or a location circuit that can include, for example, a Global Positioning System (GPS) receiver, a triangulation receiver, a tilt sensor, a gyro or gyroscope, an electronic compass, a velocity sensor, or any other information collecting device that can identify a current location or user-device interface (carry mode) of the mobile device 102. For purposes of simplifying the present discussion, the sensors 228 will be considered to not include devices that can be considered among the input devices 210, such as touch screen 104 or the infrared sensor 112 (which can also be an infrared transceiver), although it should be appreciated that the terms sensor and input device can also easily be defined in a different manner such that some sensors are input devices and/or vice-versa. As will be described below, the floating lens forming the touch screen 104 is implemented adjacent to a piezoelectric component (which can be a sensor or an actuator or both) provided internally within the mobile device. For purposes of the present discussion regarding input devices, output devices, and sensors, this piezoelectric component can be considered part of the touch screen 104 (or the touch screen assembly).

The memory portion 206 of the internal components 200 can encompass one or more memory devices or databases of any of a variety of forms (e.g., read-only memory, random access memory, static random access memory, dynamic random access memory, etc.), and can be used by the processor 204 to store and retrieve data. In the present embodiment, the memory portion 206 includes, among other things, a lookup table 209, which is discussed in further detail below. Also, in some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. The data that is stored by the memory portion 206 can include, but need not be limited to, operating systems, software applications, and informational data.

More particularly, each operating system includes executable code that controls basic functions of the mobile device 102, such as interaction among the various components included among the internal components 200, communication with external devices via the wireless transceivers 202 and/or the component interface 212, and storage and retrieval of applications and data, to and from the memory portion 206. Each application includes executable code that utilizes an operating system to provide more specific functionality for the mobile device 102, such as file system service and handling of protected and unprotected data stored in the memory portion 206. Informational data is non-executable code or information that can be referenced and/or manipulated by an operating system or application for performing functions of the mobile device 102. As will be discussed below, the present embodiment envisions that a software application 207 (or applications) is particularly stored in the memory portion that governs operation of the mobile device 102 in such a manner that unintended consequences of inadvertent actuation of the touch screen 104 are partly or entirely avoided.

Figure 3:
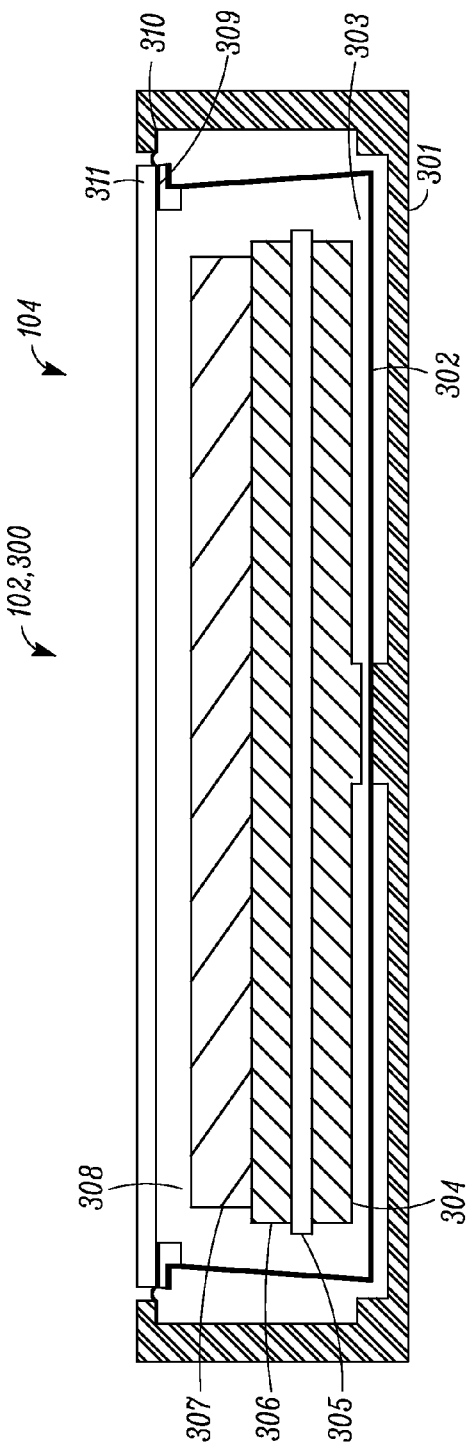
FIG. 3 is a cross-sectional diagram particularly showing the piezo lens actuator and associated component portions of the mobile device of FIG. 1 in more detail, taken along line 3-3 of FIG. 1.

Turning to FIG. 3, a cross-sectional view is provided of the mobile electronic device 102 of FIG. 1, taken along a line 3-3 of FIG. 1, to illustrate in further detail several components 300 of the mobile device and particularly components associated with the touch screen 104. The cross-sectional view particularly illustrates how various components associated with the touch screen 104 are stacked up in relation to one another and in relation to a housing 301 of the mobile device 102—that is, the cross-sectional view provides an illustration of a "module stackup". More particularly as shown, the components 300 shown in FIG. 3 include not only the housing 301 but also a piezo frame 302, a design gap (clearance/tolerance) 303, one or more printed circuit board (PCB) components (Btm) 304, additional PCB component(s) (FR-4/Flex layers) 305, further PCB component(s) (top) 306, an organic light emitting diode (OLED) display component 307, a further design gap (travel) 308, a lens/piezo frame support 309, a seal gasket or simply gasket (which in some embodiments can also be an acoustic roll, particularly where speaker functionality of the touch screen assembly is envisioned) 310, and a floating top lens (or simply touchpanel lens) 311. In the present embodiment, the lens/piezo frame support 309 is integrally formed with, and constitutes an extension of, the piezo frame 302, although this need not be the case in some alternate embodiments, in which the two parts can be distinct components that are attached or coupled to one another. Notwithstanding that the display component 307 is an OLED display component in the present embodiment, in other embodiments other types of light emitting diode (LED) display components or other display components can be employed.

The assembly of the components 300 can be understood as one in which all of the respective elements 302, 303, 304, 305, 306, 307, 308, 309, 310, and 311 are stacked in succession between the element 301 (the housing) and the element 311 (the floating top lens). The lens/piezo frame support 309 links the floating top lens 311 with the piezo frame 302. The piezo frame 302 is a piezoelectric component connected with (in electrical communication with) other component(s) of the mobile device 102 such as the processor 204 of FIG. 4, and is capable of outputting electric signal(s) for use by other component(s) of the mobile device when pressure is applied to the floating lens 311. The piezoelectric component can be made of a piezo-ceramic material, for example. The piezoelectric component can also be a composite structure consisting of a piezo-ceramic material adhered to a carrier structure. The carrier structure would be used to carry, strengthen, and attach the piezoelectric component to other components such as the housing and the lens/piezo frame support, lens or display.

By virtue of the connection afforded by the lens/piezo frame support 309, pressure applied upon the floating top lens 311 tending to move that lens downward (toward the interior of the mobile device 102) tends to result in pressure being applied to the piezo frame (piezoelectric component) 302 that can trigger or otherwise actuate that piezoelectric component such that corresponding electric signal(s) are sent to the processor 204 and/or other component(s) of the mobile electronic device 102. During normal operation of the mobile electronic device 102, such electric signal(s) can be interpreted as signals intended to cause the mobile electronic device (or components thereof) to take various actions or produce various consequences. For example, during normal operation of the mobile device 102 in some operational circumstances, pressure applied to the floating top lens 311 precipitating actuation of the piezo frame 302 (and corresponding output of an electric signal therefrom) can be interpreted as a command to initiate a telephone call, for example, by dialing a phone number that is already displayed on the touch screen 104.

The components 300 are designed to have low thicknesses so that the overall module stackup (and the mobile device 102) has a small or modest thickness. In the present example, the components 300 are designed such that the overall thickness of the overall assembly of the components (and thus the mobile device 102 itself) can be quite thin, with a total thickness of only about ten (10) millimeters. This is achieved when the respective elements 301, 302, 303, 304, 305, 306, 307, 308, 309, 310, and 311 have respective thicknesses of 1.000, 0.200, 0.050, 2.000, 1.000, 1.300, 2.000, 0.350, 1.000, 0.100, and 1.000 millimeters (such than the accumulated thickness of the overall assembly after adding each of the respective elements is 1.000. 1.200, 1.250, 3.250, 4.250, 5.550, 7.550, 8.900, 9.000, and 10.000 millimeters, respectively). The thickness values are only examples, and the various thickness values can vary considerably depending upon the embodiment. For example, the thicknesses of the housing 301, additional PCB component(s) 304, 305 306, and lens/piezo frame support 309 can be further reduced in other embodiments. Also, notwithstanding the particular components 300 of the module stackup shown in FIG. 3, in other embodiments or applications one or more of these components can be eliminated and/or one or more other components can be added.

Given the above arrangement, the touch screen 104 with the floating top lens 311 can be actuated, so as to actuate the piezo frame 302 such that electric signal(s) are generated thereby and sent to other component(s) of the mobile device 102) in a variety of circumstances. Many of these actuations are valid actuations in the sense that the actions/events causing those actuations are in fact actions/events that should be recognized by the mobile device 102 as proper bases for the mobile device to, in turn, take additional actions or produce additional consequences in response thereto. For example, valid actuations are those caused by a finger press such as when dialing, or answering a call, or weighing an object, or changing volume, or navigating virtual controls with the touch screen 104 having a floating top lens 311.

However, there are also actuations that are invalid actuations, in the sense that it is proper or desired that the mobile device 102 not take (that is, refrain from taking) actions or not produce consequences in response to those actuations, notwithstanding those actuations occurring. For example, invalid actuations can occur in the form of sudden actions/actuations, extreme actions/actuations, or miniscule actuations (which are below a threshold or otherwise outside a normal range of actuations) that cause the piezo frame 302 to deflect due to accidental bumps, external forces acting on the device, etc. More particularly in this regard, because the floating top lens 311 is a relatively large and exposed mass acting on the piezo frame 302, shocks and external forces can cause unintended piezo actuations (such that the piezo frame outputs electric signal(s)). For example, an intentional action (such as a vigorously waving a hand) may cause an inadvertent actuation of a piezo sensor when it is part of an electronic device worn on the wrist or held in the hand of the waving person. Further it should be appreciated that the proper response (or lack thereof) of the mobile device 102 to one or more such invalid actuations need not always be the absence of any response. For example, in some embodiments or circumstances, the proper or desired response of the mobile device 102 to an invalid actuation can be to take an alternate action or produce an alternate consequence, other than would otherwise occur in the case of a valid actuation. Embodiments of mobile devices (and other devices) that operate in this type of manner are also intended to be encompassed herein, in addition to embodiments of mobile devices (and other devices) that refrain from taking actions or producing consequences in response to invalid actuations (e.g., which "ignore" invalid actuations).

Figure 4:
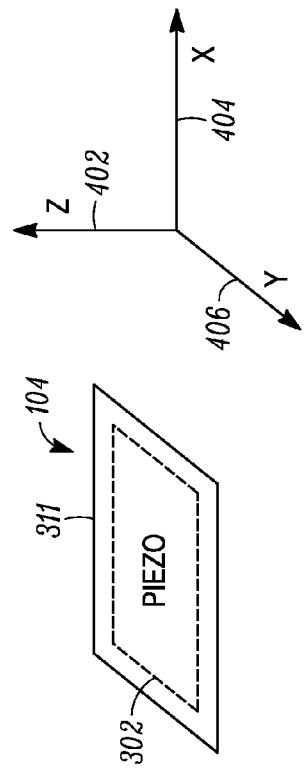
FIG. 4 is a further schematic diagram illustrating types of movements that may particularly tend to inadvertently cause actuation of the piezo lens actuator of the mobile device of FIGS. 1-3.

Referring to FIG. 4, in the present embodiment, invalid actuations of the touch screen 104 and particularly of the floating top lens 311 (and consequently the piezo frame 302) thereof, can occur due to shocks or bumps that occur in such a manner as to cause a sudden movement or cessation of movement of the touch screen 104 along a z-direction 402 perpendicular to the surface of the touch screen. By contrast, in at least some embodiments, shocks or bumps that occur in such a manner as to cause a sudden movement or cessation of movement of the touch screen 104 along an x-direction 404 or y-direction 406 within the surface of the touch screen would not tend to produce invalid actuations of the touch screen 104. In alternate embodiments, shocks or bumps occurring along any of a variety of directions can also produce invalid actuations. Note that the x, y, and z-coordinates are relative to the touch screen surface and are not relative to gravity.

Figure 5:
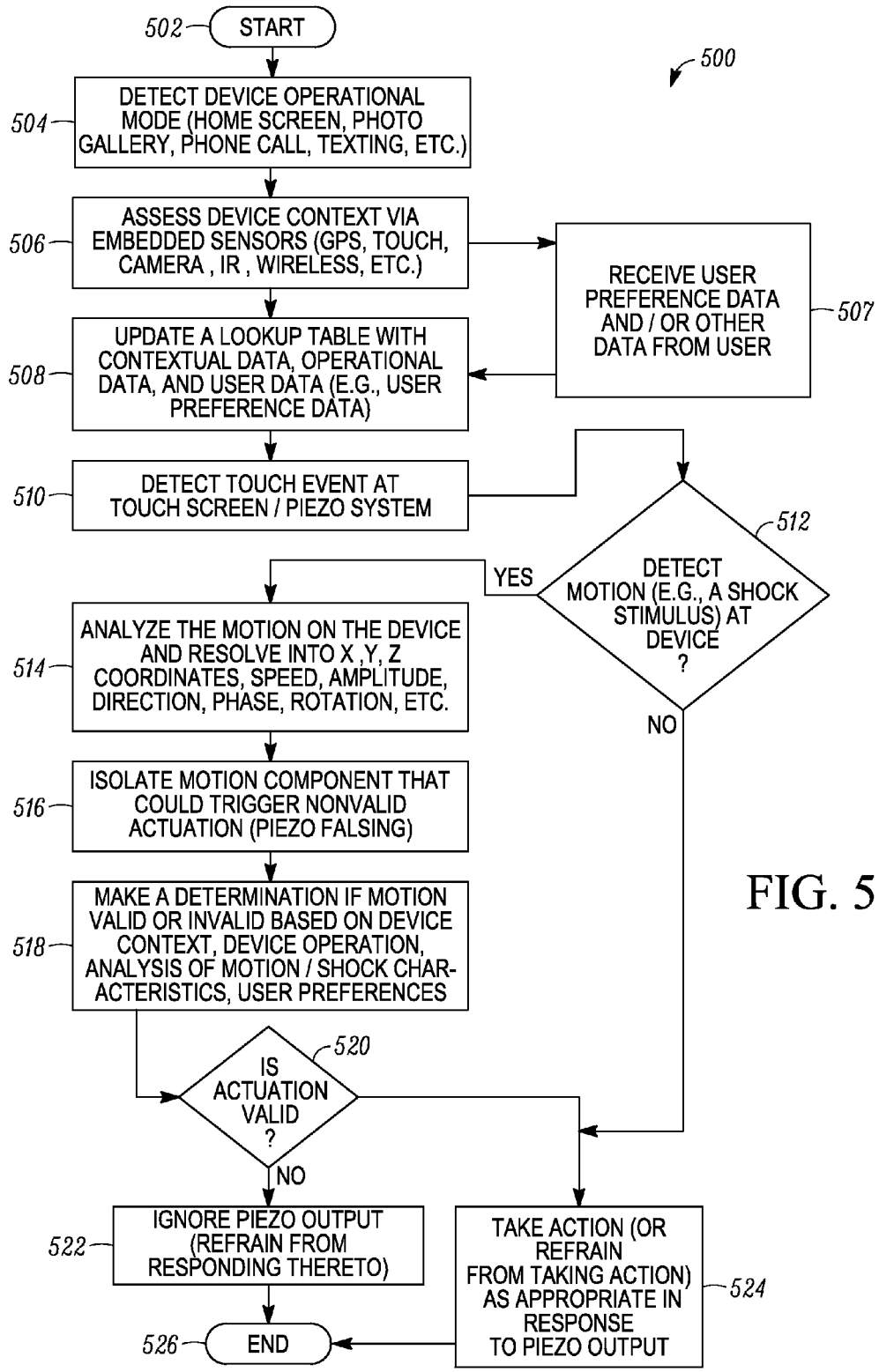
FIGS. 5 and 6 are flow charts showing exemplary operation of the mobile device of FIGS. 1-4 and, more particularly, a system implemented on that mobile device, by which unintended effects of inadvertent actuations of the piezo lens actuator can be reduced.

Referring to FIG. 5, a flow chart 500 illustrates example steps of operation of the mobile electronic device 102 of FIGS. 1-4 (and more particularly steps of operation of a system or subsystem forming part of the electronic device), by which the mobile device avoids performing operations that may be undesirable or improper in response to certain actuation (s) of the touch screen 104 of the mobile device such as those discussed above with respect to FIGS. 3-4. As shown, upon the process of the flow chart 500 beginning at a start step 502, the mobile electronic device 102 (e.g., the processor 204 thereof) at a step 504 detects an operational mode of the device. For example, the mobile electronic device 102 can determine that it itself is operating in a home screen mode, a photo gallery mode, a phone call mode, a texting mode, etc.

Next, at a step 506, the mobile electronic device 102 (e.g., the processor 204 thereof) further assesses the device operational context, for example, via one or more of the sensors 228 and/or one or more of the input devices 210 and/or one or more other sources of information. For example, the mobile device 102 can assess its operational context via information provided from any one or more of a variety of embedded sensors such as a GPS sensor, the touch screen 104, a touch sensor (other than that associated with the touch screen), an acoustic sensor, an imager or a camera on the mobile device, the infrared sensor 112, the accelerometer 114, a proximity sensor, a capacitive sensor, an environmental sensor, and a light sensor, other wireless sensors, etc. Additionally, at a step 507, the mobile electronic device 102 receives user preference data or other data from the user (or users) of the device. Such user data can include not only data regarding user preferences, settings, or specifications, but also user input data that can be stored and be purposefully used as a basis or bases for determining whether various actuations are valid or invalid.

As discussed in more detail below, for example, it is possible for the user to operate the mobile electronic device 102 to store motion information corresponding to a particular device movements or other information concerning operational circumstances of interest that define "touch exceptions", that is, circumstances of operation of the mobile electronic device 102 in which an actuation of the touch screen 104 (piezoelectric component) is interpreted as being unintended and correspondingly invalid. Such touch exceptions can relate to one or more of a variety of different movements of the mobile device including, for example, setting the mobile device onto a flat surface, movement of a mobile device in a manner consistent with the user walking or jogging, movement consistent with (related to) a specific touch event, movement of a particular duration, movement within a particular envelope, movement of a particular amplitude, etc. Also, such touch exceptions can relate to other events including, for example, a sensed movement of an external object by the mobile electronic device, a specific touch event that should be ignored (e.g., a grasping of the mobile device or other grasp), such as an off-screen gesture detected by an infrared sensor, or a duration or envelope or amplitude of movement of a user's hand proximate to the device. Although in the present discussion such touch exceptions are user-defined, it is also possible for touch exceptions to be predefined (e.g., with such information being installed onto the mobile device during its manufacture) or obtained from other sources, such as third party providers via a wired or wireless download.

Although the steps 504, 506, and 507 particularly refer to the obtaining of operational mode data (or information), contextual data (or information), and user data (or information), the type(s) and sources of data (or information) obtained by the mobile device 102 in these steps and/or additional step(s) and manner and timing of performing such steps can vary considerably depending upon the embodiment. For example, in some cases user settings, specifications, and preference data can be received by the mobile device at different times, for example, at a time well in advance of the performing of the step 504. Also, notwithstanding the presence of each of the steps 504, 506, and 507 in FIG. 5, it will be appreciated that in some embodiments only one or two of these steps (rather than all three of these steps) are performed. Also the definitions as to what types of information are included within operational mode information, contextual information, and user information can vary depending upon the embodiment.

Although the information obtained at the steps 504, 506, and 507 can be used for a variety of purposes, in the present embodiment this information is particularly obtained to allow for determining whether a given actuation of the touch screen 104 (and consequently the piezoelectric frame 302 device associated with the touch screen) is valid or invalid. To allow for use of this information in this manner, upon such data being obtained, at a next step 508 the mobile electronic device 102 updates the memory portion 206 with the operational mode information, contextual information, and user information obtained at the steps 504, 506, and 507, respectively (as well as possibly other information obtained in other manners). In the present embodiment, it is the lookup table 209 that is updated with this information, albeit in other embodiment(s) such information can be stored in other device(s) and/or portion(s) associated with the memory portion 206, such as a database (also, in some embodiments, some or all of this information can be stored at a remote location, such as in the "cloud", so as to be wirelessly accessed by the mobile device 102 when needed).

Next, upon the storing of the data at the step 508, at a step 510 the mobile device 102 detects an input at the touch screen 104. That is, due to a movement by (or force applied to) the floating top lens 311 of the touch screen 104, an actuation of the piezo frame 302 occurs such that an electric signal is output by the piezo frame for receipt by another component of the device (e.g., the processor 204). Such an actuation can potentially be a valid actuation that is the result of an intended input, e.g., a person intentionally touching the touch screen 104, or alternatively can potentially be an invalid actuation, e.g., an actuation that is the result of a movement of or application of force other than an intended touch to the touch screen, such as when the mobile electronic device 102 is dropped onto the floor.

In accordance with the present embodiment, the mobile device 102 then performs a series of additional steps 512, 514, 516, 518, and 520 to classify the actuation as either valid or invalid. Based upon this determination, the mobile device 102 then further determines whether it is proper or desirable to refrain from taking an action or producing a consequence in response to the actuation, or whether it is proper or desirable to take an action or produce a consequence (and, if so, determine what the action or consequence should be). Although the present disclosure is intended to encompass a variety of embodiments, arrangements, and methodologies by which such a determination regarding the validity or invalidity of an actuation can be made, in the present embodiment of FIG. 5 the determination particularly is made based upon signal(s) received from the accelerometer 114 of the mobile device 102 alone or in combination with other information, particularly the operational mode, contextual, and user information as determined at the steps 504, 506, and 507, respectively. That is, the present embodiment encompasses a determination technique that uses the accelerometer 114 information (and/or information from other similar embedded motion sensors, for example, a gyroscope), possibly in combination with operational mode information, user information, and/or operational (or wearable) context (e.g., carry method, background environment, location, speed, device use history, etc.), to decipher valid and invalid actuations of the piezo-electric component of the touch screen 104 and to deal with them accordingly.

As shown, more particularly upon completion of the step 510, the process of the flow chart 500 next advances to a step 512, at which the mobile device 102 determines based upon signal(s) from the accelerometer 114 (or the absence thereof) whether the mobile device has experienced a motion/shock stimulus at the same time (or substantially the same time) as the touch event at the touch screen 104 occurred in the step 510. If the mobile device has not experienced such a motion/shock stimulus at that time, then in the present embodiment the mobile electronic device 102 presumes that the actuation occurring as a result of the touch event detected at the step 510 was a valid actuation, and consequently the process advances to a step 524, at which the mobile electronic device 102 then takes an action (or refrains from taking action) as appropriate in response to the valid actuation (in response to the output of the piezo frame 302), after which the process ends at an end step 526. Such an action can include any of a variety of actions including, for example, initiating a telephone call, sending a text message, turning off an alarm, launching an application (or app) on the mobile device, or passing along a status indication (e.g., that the actuation of the piezoelectric component is valid) to another component of the mobile device or to another location. Alternatively, if the mobile device did experience a motion/shock stimulus at the same time (or substantially same time) as the touch event at the touch screen 104 occurred, then the process advances to a step 514.

At the step 514, the mobile device 102, and more particularly the processor 204 thereof, performs analysis of the motion that occurred at the mobile electronic device 102 as sensed by the accelerometer 114 and resolves that motion into x, y, and z coordinate components corresponding to the x direction 404, y-direction 406, and z-direction 402 of FIG. 4, and evaluates that motion in terms of any one or more of speed, amplitude, phase, rotation, and/or other characteristics. Depending upon the embodiment, one or more of those characteristics can be considered from the standpoint of a magnitude or overall value (e.g., overall velocity regardless of direction) as well as from the standpoint of the directional components of those characteristics as are occurring along any one or more of the x-direction 404, y-direction 406, and z-direction 402. As already discussed with respect to FIG. 4, in the present embodiment it is particularly assumed that motion/shock occurring (or forces/pressure applied) along z-direction 402 normal to the surface of the touch screen 104 is potentially a source of invalid actuations. Thus, at a next step 516, the mobile electronic device 102 (and particularly the processor 204 thereof) isolates motion component(s) from a different sensor such as the accelerometer 114 that could indicate invalid actuations of the touch screen 104/ piezo frame 302, which can also be referred to as a "piezo falsing", which in this example are any motion component(s) that have occurred along the z-direction with a phase that would indicate a non-touch event.

Upon completion of the step 516, then at a step 518 the mobile device 102 (particularly the processor 204) conducts additional analysis based on information from other sensors to make a determination of whether the motion detected at the step 512 should be deemed a valid or invalid actuation. As indicated in the flow chart 500, the analysis performed at the step 518 takes into account all of the above-discussed forms of information stored at the step 508 as well as the results of the analysis and isolation of the motion performed at the steps 514 and 516. That is, the analysis performed at the step 518 takes into account the operational mode information obtained at the step 504, the operational context information obtained at the step 506, the user preference (or setting or specification or other user-input) information obtained at the step 507, and any other information stored at the step 508, and the analyzed motion information resulting from the steps 512, 514, and 516.

Based upon the additional analysis conducted at the step 518, the mobile electronic device 102 reaches a conclusion as to whether the actuation detected at the step 510 is/was valid or invalid. If it is concluded that the actuation is/was valid at a step 520, then the process advances to the step 524, at which (as already discussed) the mobile electronic device 102 takes action (or refrains from taking action) as appropriate in response to that actuation, after which the process ends at the end step 526. However, if it is concluded that the actuation is/was invalid, then the process instead advances from the step 520 to a step 522, at which the mobile device 102 (and processor 204 thereof) operates to ignore the actuation (that is, the electrical signal output by the piezo frame 302 is ignored) by refraining from taking the action that otherwise would have been taken in response to that actuation. Upon completion of the step 522, the process again concludes at the end step 526.

It should be appreciated that the exact manner of operation (or inoperation) of the mobile device 102 at the step 522 can vary depending upon the embodiment. In the present embodiment, the mobile device 102 at the step 522 (due to the actuation of the step 510 being determined as invalid) operates so as to refrain from taking an action that otherwise would have been performed in response to the actuation of the step 510 if that actuation had been determined to be valid. For example, if the normal actuation of the mobile electronic device 102 in response to the actuation of the touch screen 104 (e.g., the action performed at the step 524 upon it being determined that a valid actuation had occurred) involved initiating a telephone call, the mobile device in the present embodiment upon reaching the step 522 (due to the actuation of the step 510 being determined as invalid) would refrain from initiating such a telephone call. As another example, if the step 524 action is to backlight a display, the corresponding step 522 might be to not backlight the display.

Nevertheless, although the mobile electronic device 102 in the present embodiment operates to ignore any invalid actuation of the touch screen 104 insofar as the mobile device refrains from taking the otherwise-normal action in response to that actuation, it should be appreciated that in alternate embodiments the mobile device 102 can respond in other or additional manners where the mobile device does take one or more action(s) or produce one or more consequence(s) in the step 522 that differ from the normal actions reflected at step 524. For example, in one alternate embodiment, supposing an example in which the normal action of step 524 responsive to the actuation of the touch screen 104 is to hang-up an active telephone call, the corresponding action at the step 522 might be to present a dialogue box to the user asking "Would you like to hang-up your call?" and presenting "Yes" and "No" virtual buttons for the user to select. Or the mobile device could simply enunciate out loud a humorous message "Ouch!" at step 522 signifying that the mobile device 102 had recognized it had been dropped, rather than performing any other action at step 524.

Figure 6:
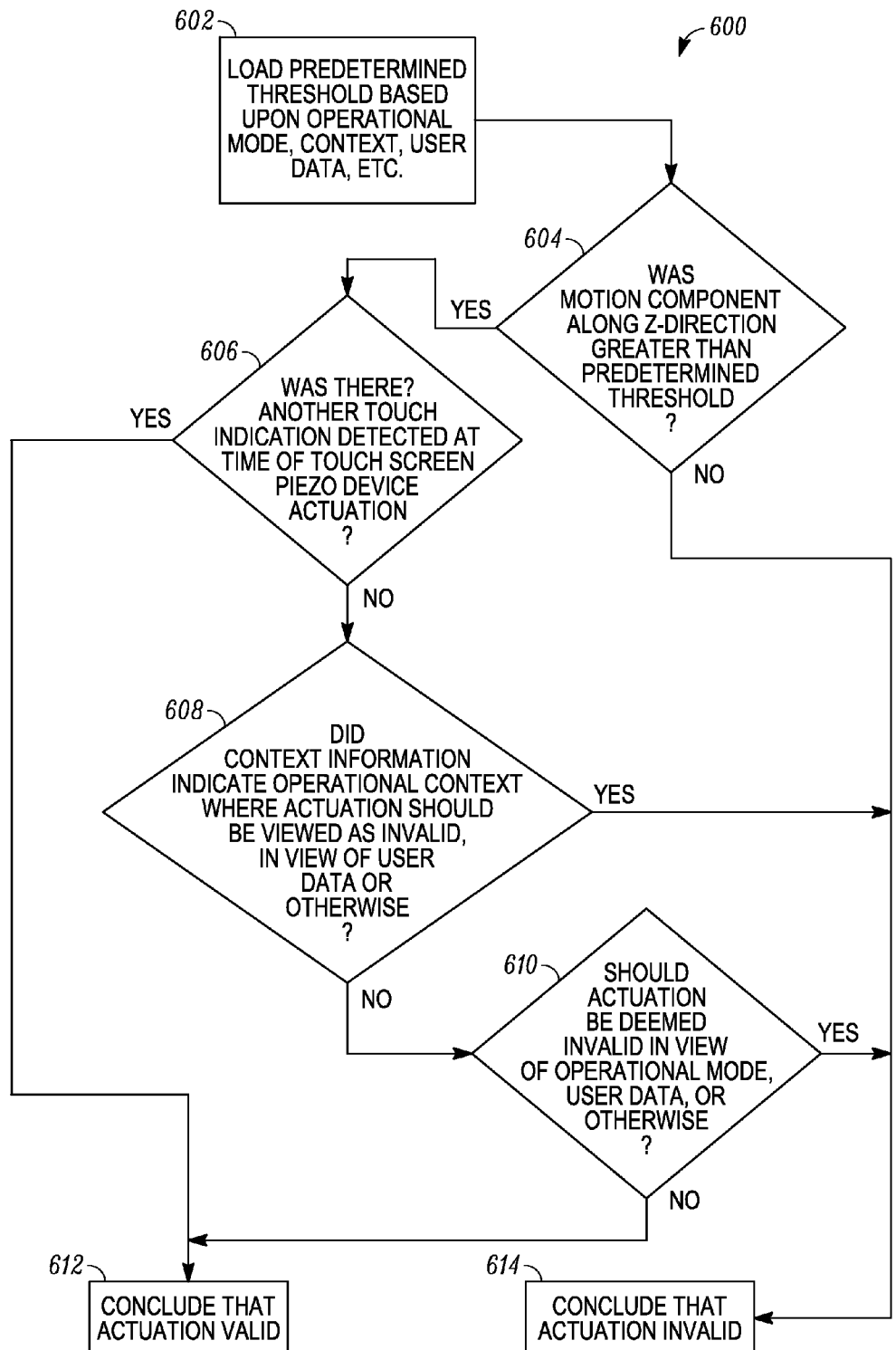

As already discussed with respect to the FIG. 5, the mobile electronic device 102 conducts additional analysis at the step 518 to make a determination of whether the motion detected at the step 512 correlates to a valid event or not. The analysis of the step 518 can take into account a variety of types of information, and thus the analysis can be viewed as including several substeps of an additional flow chart 600 as shown in FIG. 6. More particularly as shown, the flow chart 600 corresponding to the step 518 first includes a step 602 at which the mobile electronic device 102 loads one or more predetermined thresholds based upon one or more portions of the operational mode data, contextual data, or user data (or other data). The one or more predetermined thresholds are loaded onto the processor 204 from the memory portion 206 in response to requests or commands from the processor. In some embodiments, the predetermined thresholds are stored on the memory portion 206 at the time of manufacture of the mobile device 102. Also, in some such (or other) embodiments, the predetermined thresholds are stored on the memory portion 206 due to processing by the processor 204 and/or operation of the mobile device 102. For example, predetermined thresholds can be calculated by the processor 204 based upon past operational mode, operational context, or user data and then stored on the memory portion 206, and then such predetermined thresholds are later accessible for use by the processor 204 at the step 602. The step 602 be understood, in at least some embodiments, to include also such processing, calculating, or deriving of predetermined thresholds (or alternatively such actions can be considered as a step occurring prior to the step 602).

Next, at a step 604, the mobile electronic device 102 determines whether a motion component (as detected by another sensor such as the accelerometer 114) along the z-direction 402 as determined at the step 516 is greater than the predetermined threshold loaded at the step 602. If the z-direction motion component was not so large as to exceed the predetermined threshold, then the mobile device 102 proceeds from the step 604 to a step 614, at which the mobile device concludes that the actuation detected at the step 510 should be deemed invalid at the step 518. However, if the z-direction motion component was sufficiently large as to exceed the predetermined threshold, then the mobile device proceeds form the step 604 to a step 606. It should be noted that, although the present embodiment particularly considers the z-direction motion component in this regard, in relation to a predetermined threshold or thresholds (e.g., with respect to phase and amplitude), in other embodiments it is possible that aspects of the x-direction motion component and/or y-direction motion component (or an angular/rotational motion component) can also be considered.

At the step 606, the mobile device 102 further considers whether there was any other sensed indication received by the mobile device that was detected at the same (or substantially the same) time as the touch event was detected at the step 510, that could serve as corroborating evidence as to the nature of the touch event detected due to the actuation of the piezo frame 302 associated with the touch screen 104. For example, the mobile device 102 can consider whether another signal was received, such as a capacitive or resistive touch screen signal, indicating that user's finger actually did touch the touch screen. In this case, if there is appropriate corroborating evidence that the touch event was intentional, then the process advances from the step 606 to a step 612, at which the mobile device concludes that the actuation should be deemed valid at the step 518. However, if at the step 606 it is determined that there was no such corroborating evidence (or insufficient evidence), then the process instead advances to a step 608.

At the step 608, the mobile electronic device 102 next considers whether the context information indicates that the operational context is such that the actuation detected at the step 510 is likely (or highly likely) to be invalid, or otherwise should be viewed as invalid in view of user data (as obtained at the step 507) or otherwise. Such an operational context can, for example, be one where the mobile electronic device 102 recognizes that the user is jogging or walking and thus moving the mobile device in a vigorous manner likely to trigger the piezo frame 302 of the touch screen 104 even though no triggering is intended by the user. The mobile device 102 can determine that such an operational context is a basis for invalidating the actuation, for example, by comparing the contextual information with user data stored in the memory portion 206 (e.g., a database thereof) representative of movement of the mobile device when the user is jogging or walking and determining that there is a match (as mentioned above, a "touch exception").

If the operational context is such that the actuation of the step 510 is likely to be invalid, or should be viewed as invalid, then the process again proceeds immediately to the step 614 but, if not, then the process advances instead to a step 610. At the step 610, the mobile electronic device 102 additionally considers whether the actuation should be deemed invalid in view of operational mode data or user data as obtained at the steps 504 and 507, respectively, or for some other reason. If this is the case then the process again proceeds to the step 614 but, if not, then the process advances again instead to the step 612.

The steps of the flow charts 500 and 600 are merely intended to be examples and also merely constitute examples in terms of the number and arrangement of steps. It should be appreciated that, although the flow chart 500 includes the step 512 involving detection of motion at the mobile device 102 by way of the accelerometer 114 (or alternatively some other motion sensing device or devices), and the steps 514, 516, and 518 (and corresponding substeps 602 and 600) envision the use of such detected motion information as a basis (at least in part) for determining whether in fact the touch event of the step 510 should be viewed as valid or invalid, in alternate embodiments the determining of whether the actuation of the touch screen/piezo component is valid or invalid is determined only upon other information, such as the operational mode, contextual, or user data obtained during the steps 504, 506, and 507, respectively. In such embodiments, the steps 512, 514, and 516 can be dispensed with and the step 518 can be performed in a modified manner in which the operating mode data, contextual data, and/or user data serves as the basis for determining validity or invalidity of the actuation of the touch screen/piezo component. Also, in some such alternate embodiments, one or more of the steps 504, 506, and 507 can be performed subsequent to the step 510 (this is additionally true if one or more of the steps 512, 514, and 516 are still present).

For example, in one alternate embodiment, the mobile device 102 can determine at the step 506 whether an additional touch sensor (other than the piezo frame 302) associated with the touch screen 104 was actuated at the same or substantially same time as the touch event of the step 510 occurred. In at least some such embodiments, the additional touch sensor can be, further for example, a capacitive, resistive, acoustic, ultrasonic proximity, or optical touch sensor, and in some cases the additional touch sensor will be integrated with the touch screen 104 so as to be actuated by user pressure applied to the same actuation surface. Or, additionally for example, in another alternate embodiment, at the step 506 the mobile device 102 can determine whether the infrared sensor 112 detected another event (e.g., a hand motion in relation to the infrared sensor) at the same or substantially the same time as the touch event of the step 510. In each of these embodiments, as well as other embodiments, the additional information obtained at the steps 504, 506, and/or 507 is used by the mobile device 102 to determine or corroborate whether the touch event at the step 510 should be classified as a valid actuation (or an invalid actuation).

In view of the above description, numerous additional specific scenarios of operation of the mobile electronic device 102 or other electronic devices can be envisioned. For example, in the event of a sudden movement/force acting on the device that is capable of causing an actuation of the touch screen (or other sensor), such as a drop or "bump" detectable via a three-axis accelerometer, the device (or a system portion thereof, such as a processor) analyzes the movement/force and resolves it into its three axis components, x, y, and z relative to the device. By resolving the movement force into its components, the device (or system portion thereof) is able to assess the magnitude of the drop/bump along a direction normal to the surface of the touch screen (or possibly other sensor of interest) that would ordinarily be the direction of force application to the touch screen when actuated normally by a user (or user apparatus such as a stylus). After obtaining this information regarding the force/movement experienced by the device, the device further considers other information. For example, the information regarding the force/movement can be compared with other information, such as a predetermined threshold based upon a user-settable menu preference setting. Based upon this comparison (e.g., based upon the user setting in this case), the mobile device 102 decides whether to ignore the actuation that occurred with the drop/bump action as being a false activation of the piezo frame (piezoelectric component).

Again, the decision to ignore can be determined depending upon any of a wide variety of information and/or criteria including, for example, user preference setting(s), bump/force duration, bump x, y, z vector components, bump amplitude, bump profile, unique gestures, user definable gestures, device operational mode(s), device context(s) (e.g., whether the mobile device is currently located on a train and experiencing train vibration, or whether the mobile device is currently being held by a jogger and experiencing movement associated with jogging steps). In at least some embodiments, the motion of the mobile device 102 prior to the detected touch event at the step 510 can be tracked by the accelerometer 114 and the determination at the step 518 can take into account this past movement history. For example, it can be determined based upon the past movement history whether a user's arm was moving in a particular direction but then experienced a sudden change in movement indicating that the arm accidentally contacted another object (e.g., the user's arm bumped something) causing the inadvertent touch on the screen, which would tend to indicate an invalid actuation. Consideration of past movement history can be performed at, for example, the step 608 discussed above.

In at least some embodiments, an actuation of the touch screen 104/piezo frame 302 is only ignored when there is sensed a movement/shock (drop or bump) with a significant component that causes touch screen 104/piezo frame 302) to deflect along the axis normal to the touch screen surface, e.g., along the z-direction 402 of FIG. 4 (that is, if the force is found to have a z component; with a bump direction perpendicular to the glass surface, the bump is deemed to be a potential candidate for a piezo falsing). In such embodiments, a horizontal bump (e.g., a movement/shock with components only or substantially only along the x-direction 404 or y-direction 406 of FIG. 4) can be deemed acceptable and not indicative of an invalid actuation. However, in other embodiments the mobile device 102 can be configured to operate differently in terms of determining whether actuations are valid or invalid. Additionally for example, the mobile device can be configured to ignore any actuation as invalid whenever such actuation was accompanied by a movement/shock of sufficient magnitude regardless of the particular direction or direction(s) associated with the movement/shock.

Still additional scenarios are possible as well. For example, one additional example scenario involves a user wearing a mobile device (a wearable mobile device) on the user's wrist. Suppose that the user wearing the device on the wrist is conducting a phone conversation while walking toward a door, and the user opens the door handle with a sudden grabbing and turning motion with the hand carrying the device. Suppose that the user's sudden motion of grabbing the door handle was a bit strong, so as to cause the touch screen (and piezoelectric sensor associated therewith) to actuate briefly. In such an example scenario, a variety of types of information can be employed by the wearable mobile device to determine that the actuation of the touch screen is invalid such that the actuation should be ignored (or that some other action should be taken in view of the actuation being invalid). First, context information can be utilized by the wearable mobile device in its decision. For example, assuming that the touch screen in this embodiment includes a capacitive sensing capability, in this scenario there is almost certainly a lack of any capacitive touching signal from the touch screen 104, which is indicative of the touch screen 104 not being touched by the user's finger. Alternatively, an absence of a touching by the user's finger can also be determined in a variety of other manners not involving a capacitive touch determination including, for example, sensing signals provided from the infrared sensor 112 (another sensor such as a proximity, resistive, imager, etc.).

Second, other context information indicative of the user's walking motion and ceasing thereof can also be detected by the wearable mobile device via signals received from the accelerometer 114 and used in determining whether an actuation is valid or invalid. In this regard, the accelerometer 114 can detect steps by providing a pedometer function, and also detect the stopping of the user when the user reaches the door to open the door. Further, the wearable mobile device via signals received from the accelerometer 114 can also detect motions interpreted as the opening of a door handle, by detecting a rotational motion (gesture) of the wrist accompanied by a lack of translational movement of the wrist (that is, the wrist is stationary insofar as the user's hand grabbed on to door handle and then did not move aside from rotational movement to open door).

Further in regards to such context information, it should be appreciated that each of these types of motions or gestures (or absence of motions or gestures) are not only motions that can be sensed by the wearable mobile device, but also are motions having corresponding motion data that is unique (or substantially unique, e.g., stop then rotate) and can be stored in the memory portion 206 of the wearable mobile device within the lookup table 209 for reference comparison. That is, representative motion data corresponding to walking, jogging, or door opening can be stored in the memory portion 206 of the mobile device. Then, after the accelerometer 114 (or other sensor, such as a gyro) indicates a motion that matches the stored data, an operational context can be determined based upon which (or at least partly upon which) the decision at the step 518 can be made regarding an invalid actuation, such that the mobile device refrains from taking an action (e.g., terminating a phone conversation) in response to the turning of a door knob that produced the actuation of the touch screen/piezoelectric sensor.

Further for example, numerous additional example scenarios can be envisioned in which actuations of the touch screen and associated piezoelectric component are dismissed as invalid because the actuations follow certain characteristics regardless of user context, device context, operational modes, etc. In one such example scenario, a user sets preferences as to the profiles of one or more piezo actuations that are to be dismissed at all times. Then, any time an actuation occurs in which the actuation characteristics or other operational mode or context characteristics (or other characteristic(s)) are determined to match one or more of the stored profiles, the actuation is then automatically dismissed. Further for example in this regard, any actuation considered to be too brief, too fast, or too random can be dismissed.

In another example, scenario, the device stores measurements related to actual shocks and movements that have occurred in the past and are to be dismissed in the future. Additional for example in this regard, the user can perform actions upon the mobile device (e.g., drop the mobile device, bump the mobile device against a wall, and/or place the device on a table top) while activating the mobile device to sense its movement during this operations (e.g., through operation of the accelerometer and/or one or more other sensors, such as the gyro, pressure sensor(s), resistive sensor(s), mechanical sensor(s), imager(s), optical sensor(s), acoustical sensor(s), etc.), and the sensed movement data can be stored for later match, so as to allow for dismissal of actuations accompanied by such movements. In the case of accidental drops or bumps, because the exact characteristics of some future drop or bump may not (and typically will not) match up exactly with the characteristics of past drops or bumps, in at least some embodiments the stored information regarding past drops or bumps (including any information regarding simulated drops or bumps intentionally stored on the mobile device by the user) can be supplemented with other information such as applicable range or deviation information that can allow the mobile device to further (by way of processing such information) make assessments as to whether future actuations resulting from drops or bumps should be deemed valid or invalid.

Notwithstanding the above discussion focused upon determining whether an actuation of a piezoelectric sensor associated with a touch screen was valid (or invalid), the present disclosure is also intended to encompass other embodiments in which actuations of other devices or sensors are determined as being valid or invalid. That is, the present disclosure is not intended to be limited to implementations concerning merely inadvertent actuations of piezoelectric sensors.

The present disclosure is intended therefore to encompass numerous embodiments of systems and methods. In one example embodiment, a mobile electronic device operational method includes detecting a touch event with piezo touch sensor, acquiring data from an alternative sensor, determining if data captured by the alternative sensor could have caused the touch event, and passing along touch event status based on the determination.

In at least one such embodiment, the alternative sensor includes a motion sensor. Also, in at least some such embodiments, the motion sensor includes one or more of an accelerometer, gyro, electronic compass, and velocity sensor. Further, in at least one embodiment, the alternative sensor includes an alternative touch sensor operational from the same surface as the piezo touch sensor. Additionally, in at least some such embodiments, the alternative touch sensor includes one or more of a capacitive, resistive, acoustic, ultrasonic proximity, or optical touch sensor. Further, in at least some such embodiments, the alternative sensor includes a camera or a Force Sensitive Resistor sensor.

Also, in at least one embodiment, the mobile device uses contextual sensors to determine device location, speed, handling, position, carry mode, environmental condition. Further, in at least some such embodiments, the device context is used to set touch determination parameter thresholds. Also, in at least some such embodiments, the contextual sensors include one or more of touch, acoustic, GPS, accelerometer, imager, proximity, capacitive, environmental, or light sensors.

Further, in at least one embodiment, the mobile device uses operational modes status to assist in determination process (set touch determination parameter thresholds). Additionally, in at least some such embodiments, the device contains a database of user defined touch exceptions. Further, in at least some such embodiments, the user defined touch exceptions include one or more specific touch events, gestures, device motion envelopes, duration, and amplitudes. Additionally, in at least some such embodiments, the alternative sensor data includes data captured in period before touch event.

It should be appreciated from the above that mobile devices and/or other electronic or other devices configured for operation as described above (or similar to the manners described above) are advantageous in their operation. A variety of unintended consequences of such actuations can be avoided or reduced when the devices are operated to recognize invalid actuations as such, and to adapt accordingly. Relatedly, users' experiences with their devices are enhanced because the users can utilize their devices with greater confidence that the users' motions in their everyday lives will be less likely to trigger mobile device operations in a manner that is unintentional or not desired.

It is specifically intended that the present invention not be limited to the embodiments and illustrations contained herein, but include modified forms of those embodiments including portions of the embodiments and combinations of elements of different embodiments as come within the scope of the following claims.

We claim:

1. An electronic device comprising:
a touch screen assembly including a piezoelectric sensor at least indirectly connected to a touchable lens surface;
a different sensor; and
at least one processing device connected at least indirectly to the piezoelectric sensor and to the different sensor,
wherein the at least one processing device is configured to determine whether an actuation of the piezoelectric sensor is invalid based at least in part upon information received by the processing device from the different sensor, and
wherein the at least one processing device is configured to cause the electronic device to refrain from performing, or to perform, at least one operation upon making a determination that the actuation is invalid,
wherein the at least one processing device is configured to determine whether the actuation is invalid based at least in part upon whether a component of a motion normal to a plane of the touchable lens surface exceeds a predetermined threshold, the motion being experienced by the electronic device and being detected by way of the different sensor.

2. The electronic device of claim 1, wherein the touch screen assembly is mounted in relation to a housing and further includes one or more printed circuit board (PCB) components and a light emitting diode (LED) display component positioned between the piezoelectric sensor and the touchable lens surface.

3. The electronic device of claim 1,
wherein the different sensor includes a motion sensor that includes one or more of: an accelerometer, a gyro, an electronic compass, and a velocity sensor.

4. The electronic device of claim 1, further comprising: an additional sensing device, wherein the processing device is configured to determine whether the actuation of the piezoelectric sensor is invalid based at least in part upon additional information received by the processing device from the additional sensing device.

5. The electronic device of claim 4, wherein the additional sensing device includes one or more of an infrared sensor, a camera, or a second touch-sensitive device.

6. The electronic device of claim 5 wherein the second touch-sensitive device comprises one or more of: a capacitive, resistive, acoustic, ultrasonic proximity, or optical touch sensor.

7. The electronic device of claim 4, further comprising: a memory portion in which are stored a plurality of information portions concerning a plurality of touch event exceptions, and wherein the processing device is configured to determine that the actuation of the piezoelectric sensor is invalid if contextual information sensed by the additional sensing device matches to a first of the information portions concerning a first of the touch event exceptions.

8. The electronic device of claim 1, wherein the electronic device includes one or more contextual sensors to determine contextual information, wherein the contextual sensors include one or more of a touch sensor, an acoustic sensor, a global positioning system (GPS) sensor, an accelerometer, an imager, a proximity sensor, a capacitive sensor, an environmental sensor, and a light sensor, and wherein the contextual information relates to one or more of a device location, a device speed, a manner of device handling, a device position, a device carry mode, and an environmental condition 9. The electronic device of claim 1, wherein the touch screen assembly includes a lens component and an arm component linking the lens component at least indirectly to the piezoelectric sensor, such that first movement of the lens component results in second movement of the piezoelectric sensor.

10. An electronic device comprising:
a touch screen assembly including a piezoelectric sensor at least indirectly connected to a touchable lens surface;
a motion sensor including one or more of an accelerometer, a gyro, an electronic compass, and a velocity sensor; and
at least one processing device connected at least indirectly to the piezoelectric sensor and to the motion sensor, wherein the at least one processing device is configured to make a determination of whether an actuation of the piezoelectric sensor is invalid based at least in part upon information received by the processing device from the motion sensor, the information being indicative of whether a component of a motion normal to a plane of the touchable lens surface exceeds a predetermined threshold, and wherein the at least one processing device is configured to cause the electronic device to refrain from performing, or to perform, at least one operation upon the determination.

11. The electronic device of claim 10, further comprising:
wherein the at least one processing device further receives additional information including user data, the user data concerning one or more of a user preference, a user setting, or a user specification,
wherein the motion sensor includes the accelerometer, and
wherein the at least one processing device is configured to make the determination also based at least in part upon each of:
(a) the additional information;
(b) and
whether an additional touch indication is detected as occurring substantially simultaneously with the actuation of the piezoelectric sensor.

* * * * *